United States Patent
Tan et al.

(10) Patent No.: US 10,424,300 B1
(45) Date of Patent: Sep. 24, 2019

(54) DEVICE IDENTIFICATION WITHIN A PERSONAL AREA NETWORK

(71) Applicant: MOTOROLA SOLUTIONS, INC, Chicago, IL (US)

(72) Inventors: Choon Cheng Tan, Permatang Pauh (MY); Mohamad Adib Osman, Sungai Petani (MY); Carmen Jia Yi Siau, Kota Kinabalu (MY); Woei Chyuan Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/010,533

(22) Filed: Jun. 18, 2018

(51) Int. Cl.
*G10L 15/00* (2013.01)
*G10L 15/22* (2006.01)
*H04W 4/80* (2018.01)
*H04L 29/12* (2006.01)

(52) U.S. Cl.
CPC .......... *G10L 15/22* (2013.01); *H04L 61/3065* (2013.01); *H04W 4/80* (2018.02); *G10L 2015/223* (2013.01)

(58) Field of Classification Search
CPC ....... G10L 15/265; G10L 17/22; G10L 15/08; G10L 15/30; G10L 21/0208; G06F 3/167; G06F 3/04883; G06F 3/04845; G06F 3/0482; G08B 21/043; G08B 21/0446; G09G 2320/0626; G09G 3/34; H04R 3/04
See application file for complete search history.

(56) References Cited

U.S. PATENT DOCUMENTS

| | | | | |
|---|---|---|---|---|
| 9,075,435 B1 * | 7/2015 | Noble | ...................... | G06F 3/013 |
| 2006/0073855 A1 * | 4/2006 | Bocking | .................. | H04M 1/22 |
| | | | | 455/567 |
| 2006/0248183 A1 * | 11/2006 | Barton | ..................... | H04L 51/24 |
| | | | | 709/224 |
| 2009/0252371 A1 * | 10/2009 | Rao | .......................... | H04N 1/60 |
| | | | | 382/100 |
| 2016/0234868 A1 * | 8/2016 | Gill | ......................... | H04W 4/16 |
| 2019/0147721 A1 * | 5/2019 | Avitan | .................. | G08B 21/043 |
| | | | | 340/573.1 |

\* cited by examiner

*Primary Examiner* — Edgar X Guerra-Erazo (57) ABSTRACT

A method and apparatus for associating a name to a device/virtual partner is provided herein. During operation, virtual-partner "names" will be determined for each co-located virtual partner. When a task is conveyed to a virtual partner, the virtual partner will perform the task only if its "name" has been called. The "name" of each virtual partner will be associated with a color shown on a device screen (i.e., the device associated with the virtual partner), object shown on a device screen, and/or color of another indicator that is displayed on the device.

7 Claims, 5 Drawing Sheets

DEVICE IDENTIFICATION WITHIN A PERSONAL AREA NETWORK

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable information and resources such as vehicle histories, arrest records, outstanding warrants, health information, real-time traffic, device status information, and any other information that may aid the user.

Many such communication devices further comprise, or provide access to, a voice output and/or electronic digital assistants (or sometimes referenced as "virtual partners") that may provide the user thereof with audible information in an automated (e.g., without further user input) and/or semi-automated (e.g., with some further user input) fashion. The audible information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

A problem occurs when a user carries more than one device comprising a virtual partner. When this happens, it can be ambiguous as to what piece of equipment a voice communication is referring to. For example, if the user wants to query a virtual partner to determine what the weather is going to be like today, simply asking this question may result in many virtual partners answering the question, which can be confusing.

A solution to the above-mentioned problem is to name each virtual partner, and have the virtual partner only respond to a query once its name has been called. While this solution may alleviate the above problem, a user will be forced to remember all device names. For example, a police officer may be in their squad car with their partner. Each officer in the squad car may have multiple devices, each having their own unique virtual partner. In addition, the squad car may also have its own virtual partner. The devices used by the officers and the automobile used by the officers may change daily. Having to remember all virtual-partner names may be an unacceptable solution to the above-mentioned problem.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for associating a name to a virtual partner is provided herein. During operation, virtual-partner "names" will be determined for each co-located virtual partner. When a task is conveyed to a virtual partner, the virtual partner will only perform the task if its "name" has been mentioned. The "name" of each virtual partner will be associated with a color displayed on a device (i.e., the device associated with the virtual partner) and/or object displayed on the device.

For example, consider a plurality of co-located devices, each having an associated virtual partner. If each device currently displays a different color screen (e.g., a different color screensaver), a person can quickly communicate with a device's particular virtual partner by announcing the device's displayed color prior to any task. For example, a user may say, "Blue, what is the weather going to be like today?". A virtual partner associated with a device currently displaying the color blue will answer the first question. All other virtual partners will remain silent.

In another example, consider a plurality of co-located devices, each having a virtual partner. If each device currently displays a different object on a screen (e.g., a object displayed for a screensaver), a person can quickly communicate with a particular device's virtual partner by announcing the device's displayed object prior to any task. For example, a user may say, "Square, what is the weather going to be like today?" A virtual partner existing on the device currently displaying the square object will answer, with all other devices remaining silent.

In another example, consider a plurality of co-located devices, each having a virtual partner. If each device currently flashes a different color light-emitting diode (LED), a person can quickly communicate with a particular device's virtual partner by announcing the LED color prior to any task. For example, a user may say, "Red, what is the weather going to be like today?" A virtual partner associated with the device currently displaying the red LED will answer, with all other devices remaining silent.

Thus according to the above, if a first device has a red screen displayed at various times, and a second device has a blue screen displayed at various times, then asking a query with the word "red" in the query will cause a virtual partner on the first device to answer the query. In a similar manner, asking a query with the word "blue" in the query will cause a virtual partner on the second device to answer the query. The same logic applies to using various shapes or objects to identify device.

Figure 1:
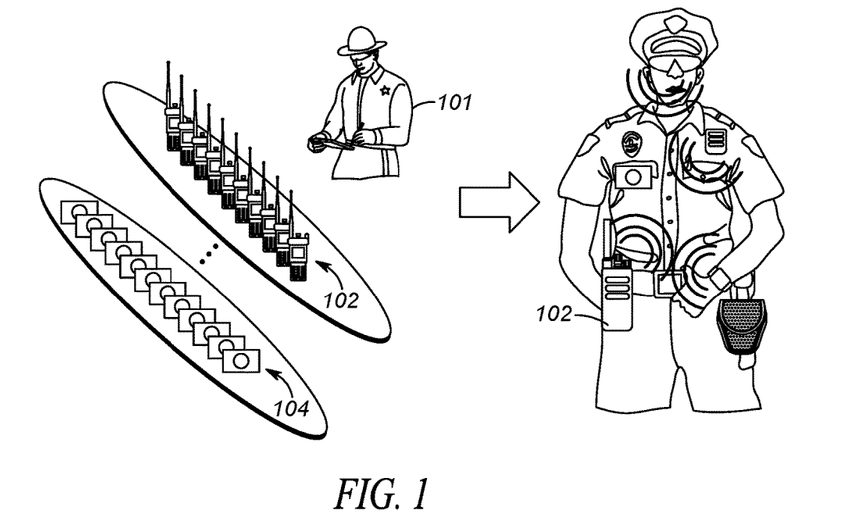
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer, along with other devices that supply information to the public-safety officer. Certain conditions are generally reported back to a dispatch center so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, a bio-sensor, . . . , etc. All devices pulled by the officer will be configured to form a PAN by associating (pairing) with each other and communicating wirelessly among the devices. At least one device may be configured with a digital assistant. In a preferred embodiment, the PAN comprises more than two devices, so that many devices are connected via the PAN simultaneously.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may pull one radio 102 and one camera 104 for use during their shift. Other devices may be pulled as well. As shown in FIG. 1, officer 101 will preferably wear the devices during a shift by attaching the devices to clothing. These devices will form a PAN throughout the officer's shift.

Figure 2:
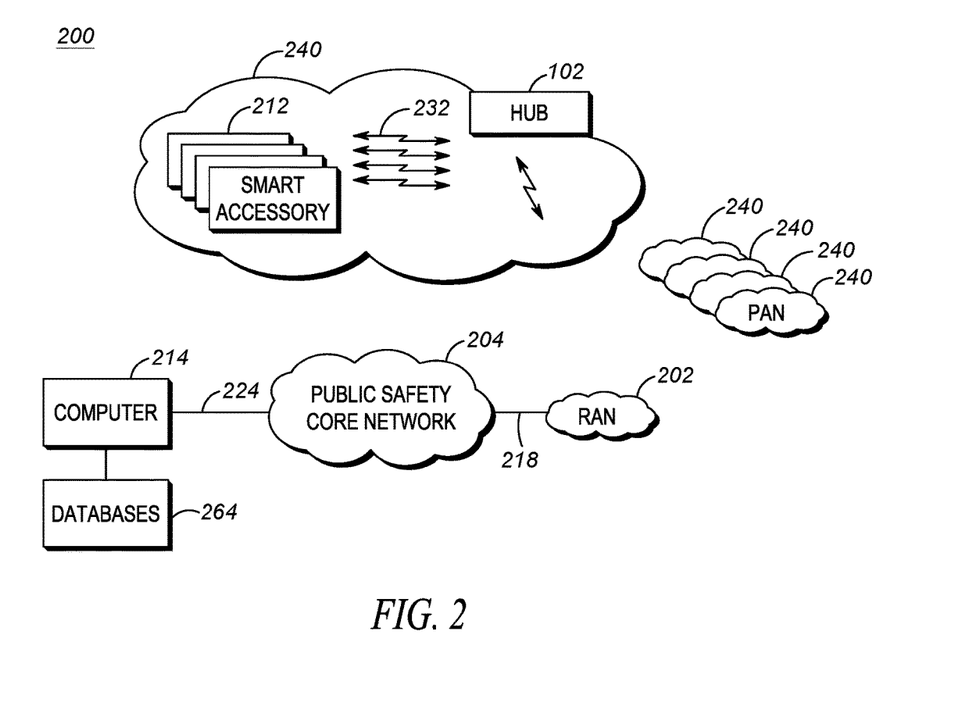
FIG. 2 depicts an example communication system that incorporates a personal-area network and a digital assistant.

FIG. 2 depicts an example communication system 200 that incorporates PANs created as described above. System 200 includes one or more radio access networks (RANs) 202, a public-safety core network 204, hub (PAN master device) 102, local devices (slave devices that serve as smart accessories/sensors) 212, computer 214, and communication links 218, 224, and 232. In a preferred embodiment of the present invention, hub 102 and devices 212 form PAN 240, with communication links 232 between devices 212 and hub 102 taking place utilizing a short-range communication system protocol such as a Bluetooth communication system protocol. Each officer will have an associated PAN 240. Thus, FIG. 2 illustrates multiple PANs 240 associated with multiple officers.

Slave devices 212 continuously determine (via self diagnostics, self sensing, . . . , etc.) environmental conditions and/or device conditions (e.g., low battery, channel change, . . . , etc.). This information may be provided to hub 102 via standard PAN messaging as part of a periodic status update message. Alternatively, the information may be provided to hub 102 upon a trigger (environmental event detected, device status detected, . . . , etc).

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art. RAN 202 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 202 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 202 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 204 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 204 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Hub 102 serves as a PAN master device, and may be any suitable computing and communication device configured to engage in wireless communication with the RAN 202 over the air interface as is known to those in the relevant art. Moreover, one or more hub 102 are further configured to engage in wired and/or wireless communication with one or more local device 212 via the communication link 232. Hub 102 will be configured to determine when to forward information received from PAN devices to, for example, a dispatch center. The information can be forwarded to the dispatch center via RANs 202 based on a combination of device 212 inputs. In one embodiment, all information received from accessories 212 will be forwarded to computer 214 via RAN 202. In another embodiment, hub 102 will filter the information sent, and only send high-priority information back to computer 214.

It should also be noted that any one or more of the communication links 218, 224, could include one or more wireless-communication links and/or one or more wired-communication links.

Devices 212 and hub 102 may comprise any device capable of forming a PAN. For example, devices 212 may comprise a police radio, a gun-draw sensor, a body temperature sensor, an accelerometer, a heart-rate sensor, a breathing-rate sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a biometric sensor (e.g., wristband), a barometer, speech recognition circuitry, a gunshot detector, . . . , etc.

Computer 214 comprises, or is part of, a computer-aided-dispatch center (sometimes referred to as an emergency-call center), that may be manned by an operator providing necessary dispatch operations. For example, computer 214 typically comprises a graphical user interface that provides the dispatch operator necessary information about public-safety officers. As discussed above, much of this information originates from devices 212 providing information to hub 102, which forwards the information to RAN 202 and ultimately to computer 214.

Hub 102 and possibly other devices 212 comprise a virtual partner (e.g., a microprocessor serving as a virtual partner/digital assistant) The virtual partner will reactively provide officer-requested information, or may provide information automatically based one or more sensor status or triggers in which the virtual partner may proactively provide such valuable information to the user absent any explicit request from the user (e.g., "I see you have drawn your weapon, do you need assistance").

Expanding on the above, each user of the system may possess a hub with many associated devices forming a PAN. For each user of the system, computer 214 may track the user's current associated PAN devices (accessories 212) along with sensor data for that user. This information may be used to compile a summary for each user (e.g., equipment on hand for each user, along with state information for the equipment). The information is preferably stored in database 264, or may be stored in a database located in hub 102 (not shown in FIG. 2). This information may be used by any virtual partner to provide valuable content to the user. As discussed, the content may be provided spontaneously, or in response to a query.

With the above in mind, all devices having a virtual partner are also configured with a natural language processing (NLP) engine configured to determine the intent and/or content of the any over-the-air voice transmissions received by users. The NLP engine may also analyze oral queries and/or statements received by any user and provide responses to the oral queries and/or take other actions in response to the oral statements.

Figure 3:
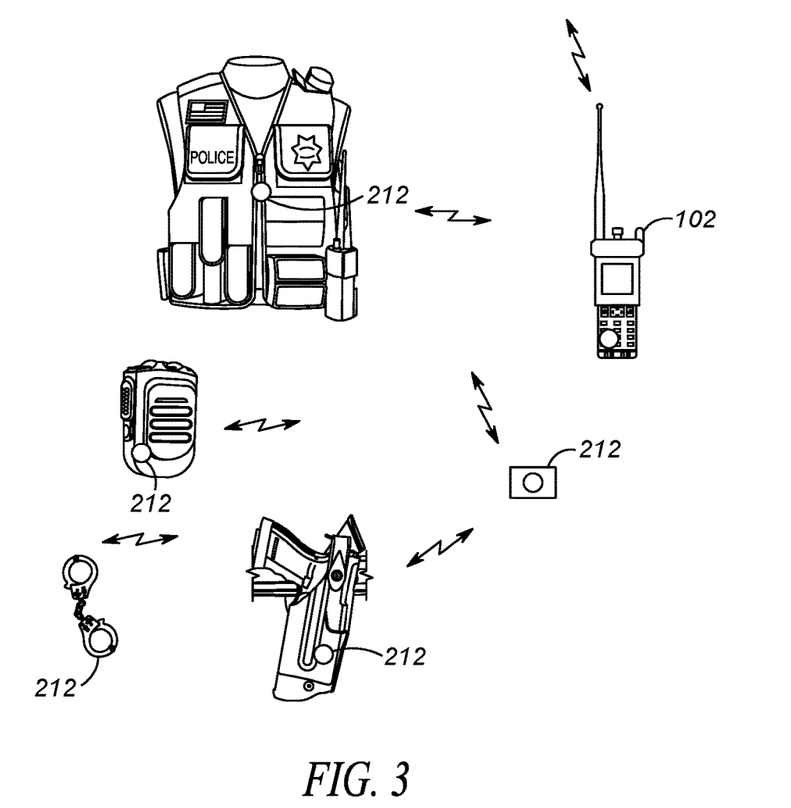
FIG. 3 is a more-detailed view of a personal-area network of FIG. 2.

FIG. 3 depicts another view of a personal-area network 240 of FIG. 2. Personal-area network comprises a very local-area network that has a range of, for example 10 feet. As shown in FIG. 3, various devices 212 may attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, and a camera 212 is provided.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a master device while devices 212 serve as slave devices.

Hub 102 provides information to the officer, and forwards local status alert messages describing each sensor state/trigger event over a wide-area network (e.g., RAN/Core Network) to computer 214. In alternate embodiments of the present invention, hub 102 may forward the local status alerts/updates for each sensor to mobile and non-mobile peers (shift supervisor, peers in the field, etc), or to the public via social media. RAN core network preferably comprises a network that utilizes a public-safety over-the-air protocol. Thus, hub 102 receives sensor information via a first network (e.g., Bluetooth PAN network), and forwards the information to computer 214 via a second network (e.g., a public safety wide area network (WAN)). When the virtual partner is located within computer 214, any request to the virtual partner will be made via the second network. In addition, any communication from the virtual partner to computer 214 will take place using the second network.

As described above, a problem occurs when a user has multiple virtual partners within the user's voice range, and it can be ambiguous as to what virtual partner a voice communication is referring to. For example, if the user wants to know what the weather is going to be like today, simply asking this question may result in many co-located virtual partners answering the question, which can be confusing. (The term "co-located is meant to mean all virtual partners within hearing range of a human providing the voice communication).

In order to address this issue, virtual-partner "names" will be determined for each co-located virtual partner. When a voice communication is conveyed to a virtual partner, the virtual partner will only respond if its "name" has been called. The "name" of each virtual partner will be associated with a color displayed on a device (i.e., the device associated with the virtual partner) and/or an object displayed on a device.

Some examples follow:

A device 102 or 212 may show a color on its screen. For example, a time-out screensaver may be displayed in a particular color. (The timeout screen is displayed when the device detects no user input/activity for a predetermined period of time (e.g., 30 seconds)). The virtual partner associated with the device will only answer a query if the once-displayed, and/or currently-displayed color has been mentioned. The particular color may be taken from the group consisting of red, orange, yellow, green, blue, indigo, and violet.

A device 102 or 212 may display a color on its screen background. For example, a touch screen may display relevant information to the user and have a background displayed in a particular color. The particular color may be taken from the group consisting of red, orange, yellow, green, blue, indigo, and violet. The virtual partner associated with the device will only answer a query if the once-displayed, and/or currently-displayed background color has been mentioned.

A device 102 or 212 may show an object on its screen. For example, a time-out screen may display the object. The object may comprise an object taken from the group consisting of a square, a circle, a triangle, a rectangle, a diamond, an oval, and a star. Other object types may comprise things such as a baseball, a basketball, a football, a face, . . . , etc. The virtual partner associated with the device will only answer a query if the currently-displayed, and/or once-displayed object has been mentioned.

A device 102 or 212 may continuously, or periodically display an LED of a particular color. The virtual partner associated with the device will only answer a query if LED color has been mentioned.

Figure 4:
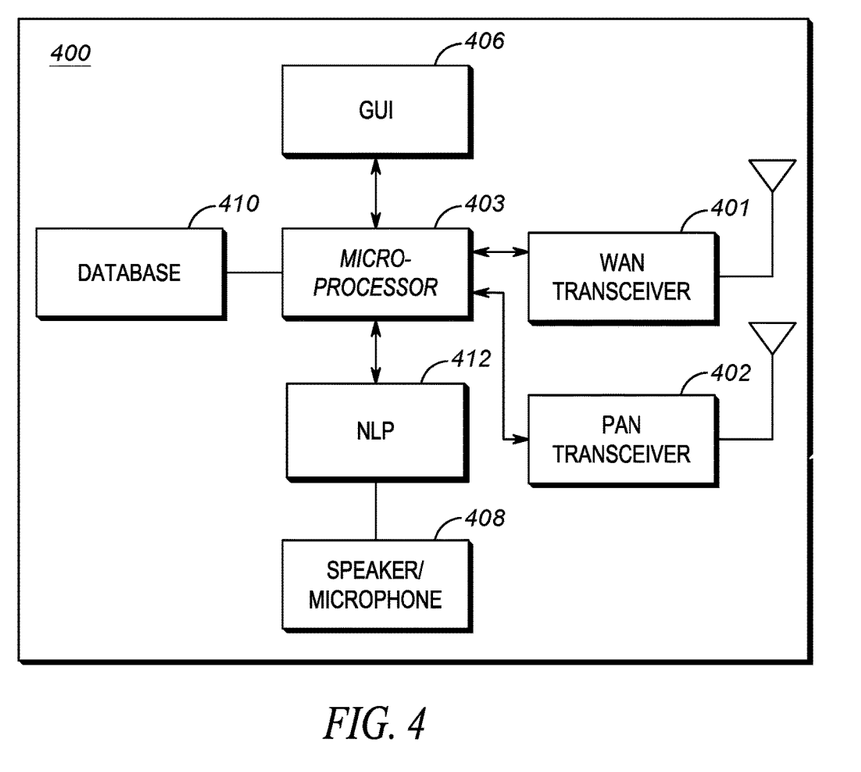
FIG. 4 is a block diagram of a hub or sensor.

With the above examples in mind, FIG. 4 sets forth a schematic diagram that illustrates a device 102, or a device 212 for displaying a particular color or object as described above.

FIG. 4 shows those components (not all necessary) for a device 400 to determine a particular color and/or object to display, display the color and/or object, and determine if an answer needs to be provided to a query. The components shown in device 400 can exist within hub 102 or sensors 212.

As shown, device 400 may include a wide-area-network (WAN) transceiver 401 (e.g., a transceiver that utilizes a public-safety communication-system protocol), PAN transceiver 402 (e.g., a short-range transceiver), Graphical User Interface (GUI) 406, database 410, logic circuitry 403, speaker 408 and NLP 412. In other implementations, device 400 may include more, fewer, or different components.

WAN transceiver 401 may comprise well known long-range transceivers that utilize any number of network system protocols. (As one of ordinary skill in the art will recognize, a transceiver comprises both a transmitter and a receiver for transmitting and receiving data). For example, WAN transceiver 401 may be configured to utilize a next-generation cellular communications protocol operated by a cellular service provider, or any public-safety protocol such as an APCO 25 network or the FirstNet broadband network. WAN transceiver 401 provides sensor status updates to dispatch center 214.

PAN transceiver 402 may be well known short-range (e.g., 30 feet of range) transceivers that utilize any number of network system protocols. For example, PAN transceiver 402 may be configured to utilize Bluetooth communication system protocol for a body-area network, or a private 802.11 network. PAN transceiver forms the PAN (acting as a master device) with various accessories 212.

GUI 406 comprises provides a way of displaying information and/or receiving an input from a user. For example, GUI 406 may provide a way of displaying a color and/or object to a user. GUI 406 may comprise an LED screen, LED touchscreen, LED, LCD screen, . . . , etc.

Speaker/microphone 408 provides a mechanism for receiving human voice and providing it to the virtual partner (e.g., logic circuitry 403/NLP 412), along with providing audible information generated by the digital assistant (e.g., a voice, a device identification, . . . , etc.).

Logic circuitry 403 comprises a digital signal processor (DSP), general purpose microprocessor, a programmable logic device, or application specific integrated circuit (ASIC) and is configured along with NLP 412 to provide digital assistant functionality and assist in determining if a query is directed towards device 400.

Database 410 is provided. Database 410 comprises standard memory (such as RAM, ROM, . . . , etc) and serves to store virtual-partner names (colors/objects). Database 410 also stores status information for each sensor (e.g., long gun in use, bullet-proof vest being worn, dun-draw sensor indicating a gun is holstered, camera indicating low power, . . . , etc.). The status information is regularly passed from sensors to hub 102 as part of normal PAN operations.

NLP 12 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

As discussed, the speaker may be configured to receive the name and task audibly, with natural-language processor (NLP) 412 coupled to the logic circuitry, and configured along with the logic circuitry to determine the subject matter of the voice communication.

As discussed above, the PAN transceiver may be further configured to receive status update messages from the PAN members as part of a periodic updating process, as requested, or when triggered by sensor/device 212. The logic circuitry is configured to determine the device identity from the status update messages.

A wide-area network (WAN) transceiver is provided for transmitting information contained within the status update messages.

As is evident, when naming virtual partners, it is desirable for the multiple virtual partners within voice range to have different names. Thus devices 102 and 212 should not display a similar color and/or object. In order to accomplish this task, devices can negotiate among themselves via standard PAN messaging to make sure there is no redundancy within the color and/or object used by the devices. For example, upon joining the PAN, a device may inquire about the colors, and/or objects utilized by existing PAN members, and logic circuitry 403 may choose a color and/or object that is not currently being utilized by an existing PAN member. The chosen color and/or object can be stored in database 410.

With the above in mind, apparatus 400 comprises microphone 408 configured to receive a voice communication, wherein the voice communication comprises a task/query and a first color and/or object. Apparatus 400 also comprises a screen or LED (GUI 406) displaying a second color and/or object. Natural-language processing circuitry 412 is provided and configured to determine the first color and/or object received in the voice communication and determine the task received in the voice communication. Logic circuitry is provided, and configured to act on the task only if the first color and/or object in the voice communication matches the second color and/or object displayed on the screen or LED.

As mentioned, when assuring no two virtual partners are named the same, a PAN transceiver may be provided and configured to receive additional colors, and/or objects displayed on other devices. The logic circuitry is further configured to cause the screen or LED to display the second color and/or object that is not displayed on the other devices.

The first color may be taken from the group consisting of red, orange, yellow, green, blue, indigo, and violet. The first object may be taken from the group consisting of a square, a circle, a triangle, a rectangle, an oval, and a star.

Figure 5:
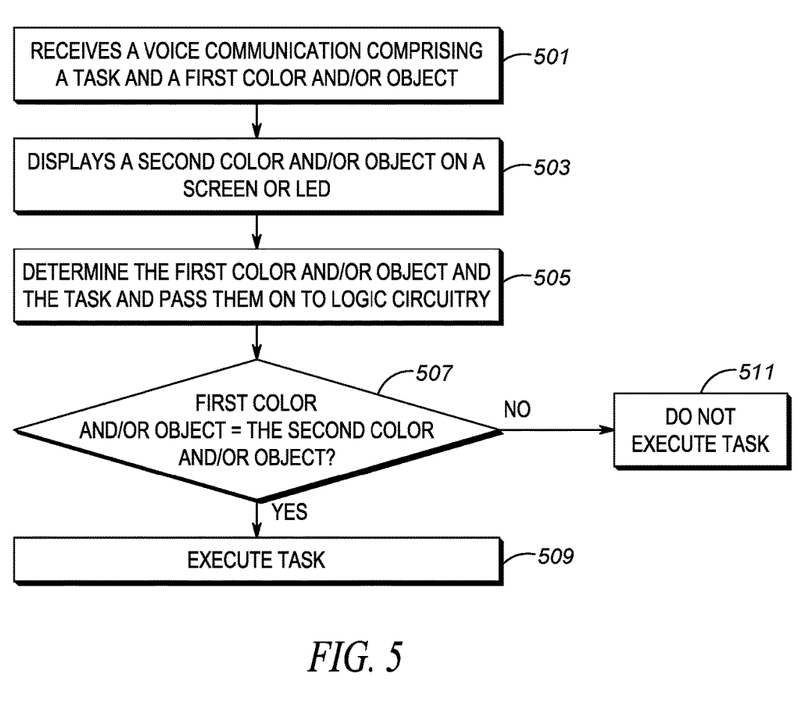
FIG. 5 is a flow chart showing operation of the device of FIG. 4.

FIG. 5 is a flow chart showing the operation of device 400. The logic flow begins at step 501 where microphone 408 receives a voice communication. As discussed above, the voice communication comprises a task and a first color and/or object. For example, the voice communication might comprise a statement such as, "Circle, what is the shortest route to work today?"

At step 503 GUI 406 is displays a second color and/or object on a screen or LED. At step 505, NLP 412 determines the first color and/or object received in the voice communication and determines the task received in the voice communication and passes them on to logic circuitry 403.

At step 507, logic circuitry determines if the first color and/or object matches the second color and/or object, and if so, executes the task (step 509), otherwise the logic flow ends at step 511. In other words, logic circuitry 403 will execute the task only if the first color and/or object in the voice communication matches the second color and/or object displayed on the screen or LED. It should be noted that the second color and/or object does not need to currently be displayed on the screen, but simply displayed as a background during the awake time of the device, or alternatively displayed on the device during a screen timeout as a screensaver, or otherwise displayed on the screen or LED at any point in any form. Information identifying the displayed color and/or object can be stored in database 410, and logic circuitry can simply compare the color and/or object stored in database 410 to the received color and/or object to determine if they are similar. In other words, logic circuitry can determine if the first s matches the second color and/or object, by determining if the first color and/or object matches the second color and/or object stored in database 410.

As discussed above, colors and/or objects displayed on other devices can be received over PAN transceiver 403 and the step of displaying the second color and/or object will comprise the step of displaying a color and/or object that is not currently being displayed on the other devices.

Figure 6:
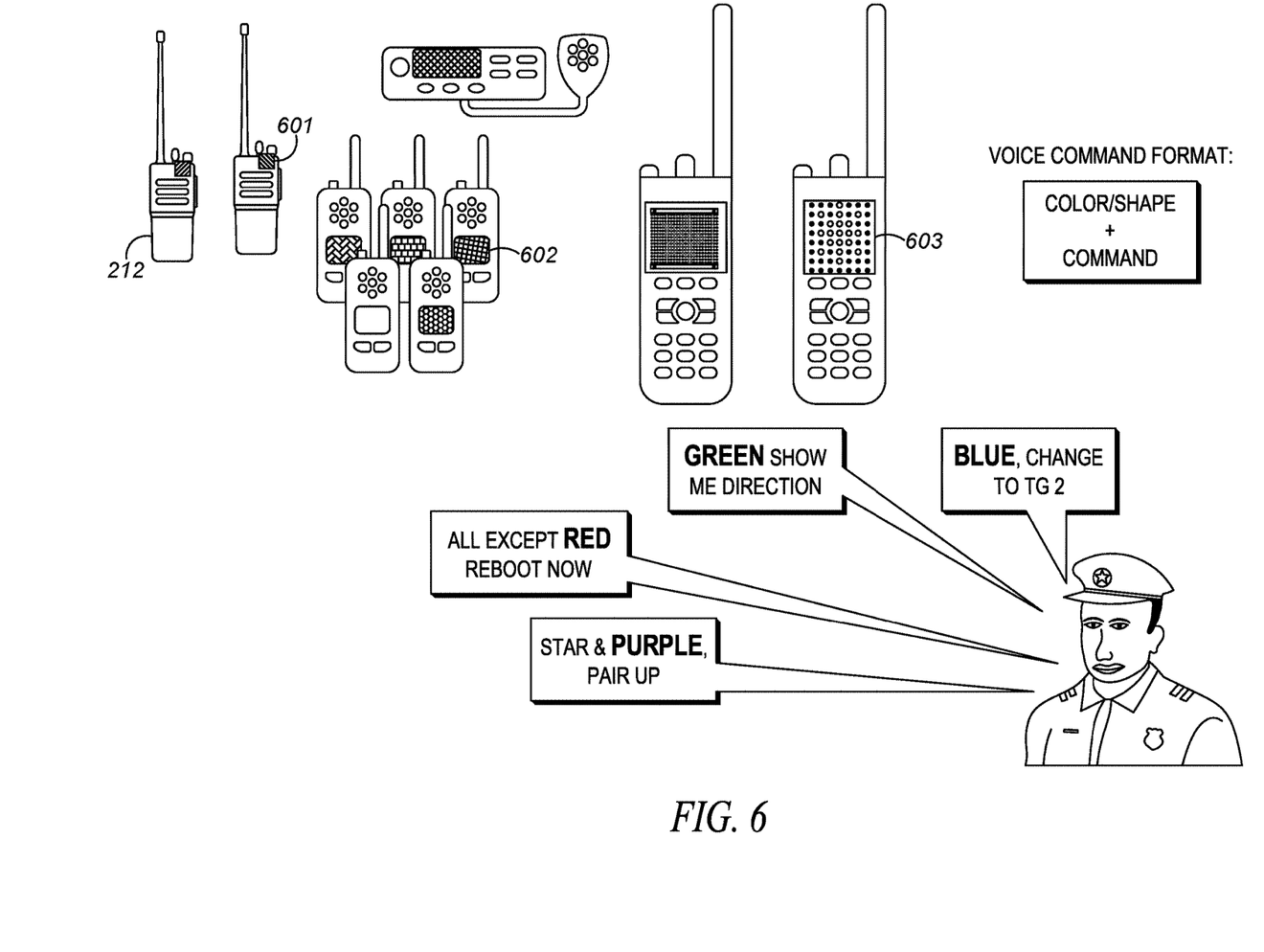
FIG. 6 illustrates operation of a personal-area network.

FIG. 6 illustrates a PAN operating as discussed above. As shown in FIG. 6, multiple devices 212 are present (only one labelled in FIG. 6). These devices comprise multiple graphical user interfaces. As shown, two devices comprise LED 601 (only one LED labelled in FIG. 6). Five devices comprise color LED screen 602 (only one LED screen labelled in FIG. 6). Finally, two devices comprise black and white LCD screen 603 (only one LCD screen labelled in FIG. 6).

As described above, the LED screens and the LEDs can be configured to display any number of colors. Additionally, the LED screens and the black and white LCD screens can be also configured to display a shape or object. As discussed above, the color and/or object can be displayed after a screen timeout as a screen saver, or as a screen background. Such a configuration allows an officer to specifically identify a virtual partner.

In the foregoing specification, specific embodiments have been described. However, one of ordinary skill in the art appreciates that various modifications and changes can be made without departing from the scope of the invention as set forth in the claims below. For example, the above description was given with members of a PAN sharing color and/or object information over a PAN. However, in alternate embodiments of the present invention, devices 102 and 112 do not need to be part of a PAN. Other techniques may be used (e.g., random techniques) to determine a color and/or object to display. In another example, every co-located virtual partner does not have to perform the above-mentioned task of naming itself. Some devices may be very familiar to a user and have specific names. In this situation, only a subset of co-located devices will name their virtual partners as described above. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a microphone configured to receive a voice communication, wherein the voice communication comprises a task and a first color and/or object;
   a screen or LED displaying a second color and/or object;
   natural-language processing circuitry, configured to:
      determine the first color and/or object received in the voice communication;
      determine the task received in the voice communication;
   logic circuitry configured to;
      execute the task when the first color and/or object in the voice communication matches the second color and/or object displayed on the screen or LED, otherwise failing to execute the task;
   wherein the first object is taken from the group consisting of a square, a circle, a triangle, a rectangle, an oval, and a star.

2. The apparatus of claim 1 further comprising:
   a PAN transceiver configured to receive additional colors and/or objects displayed on other devices; and
   wherein the logic circuitry if further configured to cause the screen or LED to display the second color and/or object that is not displayed on the other devices.

3. The apparatus of claim 1 wherein the first color is taken from the group consisting of red, orange, yellow, green, blue, indigo, and violet.

4. A method comprising the steps of:
   receiving a voice communication, wherein the voice communication comprises a task and a first color and/or object;
   displaying a second color and/or object on a screen or LED;
   determining the first color and/or object received in the voice communication;
   determining the task received in the voice communication;
   executing the task when the first color and/or object in the voice communication matches the second color and/or object displayed on the screen or LED, otherwise not executing the task;
   wherein the first object is taken from the group consisting of a square, a circle, a triangle, a rectangle, an oval, and a star.

5. The method of claim 4 further comprising the steps of:
   receiving colors and/or objects displayed on other devices; and
   wherein the step of displaying the second color and/or object comprises the step of displaying a color and/or object that is not displayed on the other devices.

6. The method of claim 4 wherein the first color is taken from the group consisting of red, orange, green, blue, yellow, indigo, and violet.

7. A method comprising the steps of:
   receiving a voice communication, wherein the voice communication comprises a task and a first color and/or object;
   displaying a second color and/or object on a screen or LED;
   determine the first color and/or object received in the voice communication;
   determine the task received in the voice communication;
   execute the task only if the first color and/or object in the voice communication matches the second color and/or object displayed on the screen or LED;
   receiving colors and objects displayed on other devices;
   wherein the step of displaying the second color and/or object comprises the step of displaying a color and/or object that is not displayed on the other devices;
   wherein the first color is taken from the group consisting of red, orange, green, blue, yellow, indigo, and violet; and
   wherein the first object is taken from the group consisting of a square, a circle, a triangle, a rectangle, an oval, and a star.

* * * * *